June 7, 1955     A. H. BLUM ET AL     2,709,942
APPARATUS FOR DEMONSTRATING OBJECTIVE LENSES
Filed Feb. 19, 1952
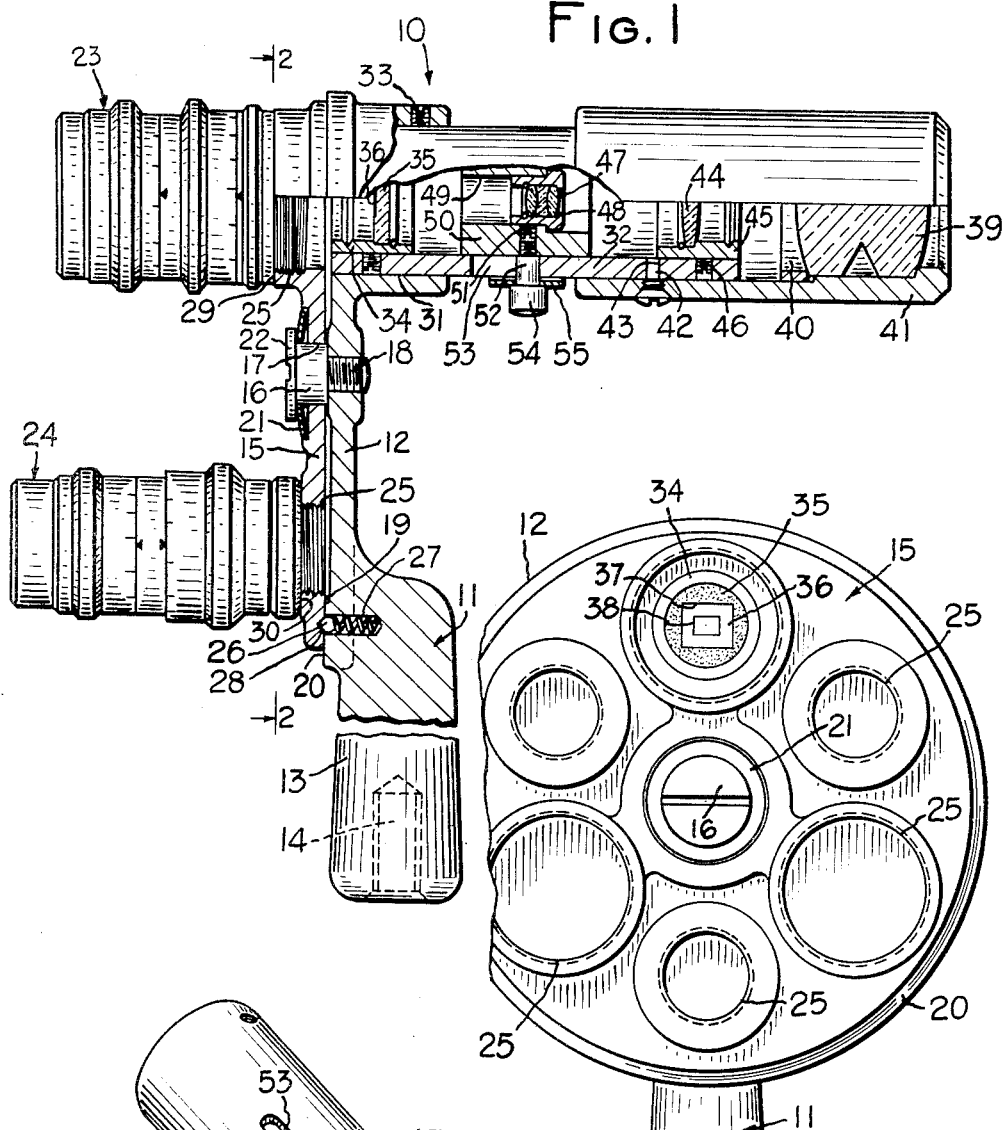
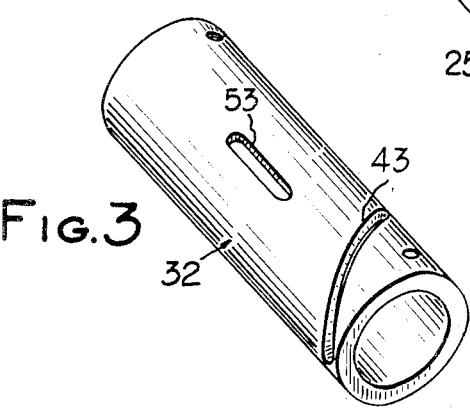
*INVENTORS*
ALBERT H. BLUM AND
BY EARL B. HOLDREN
*ATTORNEY*

2,709,942

APPARATUS FOR DEMONSTRATING OBJECTIVE LENSES

Albert H. Blum, Irondequoit, and Earl B. Holdren, Brighton, N. Y., assignors to Bausch & Lomb Optical Company, Rochester, N. Y., a corporation of New York Application February 19, 1952, Serial No. 272,333

1 Claim. (Cl. 88—1)

This invention relates to apparatus for demonstrating optical devices and more particularly it relates to apparatus for demonstrating photographic objectives and the like.

When demonstrating to a prospective customer optical devices such as photographic objectives and the like, it is advantageous to compare in sequence the optical image, field of view, and other properties which are provided by a number of objectives having different focal lengths and performance characteristics. Such properties as depth of field, magnification, speed of the lens, and angular coverage are particularly difficult to demonstrate by the usual methods.

Accordingly, it is an object of this invention to provide a simple, unitary demonstration device for photographic objectives and the like by which the image, field size, depth of field, and other optical characteristics relative to each of several such objectives may be compared visually with each other quickly and easily.

Another object is to provide such a device whereby several objectives that are used with various sizes of film may be compared with each other under accurately similar viewing conditions so as to aid in the selection of a proper lens to meet given requirements.

It is a further object to provide such a device in which the objectives are properly supported on a sturdy housing which protects the lenses against the entrance of dust and foreign matter in a manner similar to that afforded to the lenses in actual use.

Further objects and advantages reside in the novel details of construction, arrangement and combination of parts as described below in the specification and shown by the accompanying drawing in which:

Fig. 1 is a side view, partly in section and broken away, of a device embodying our invention.

Fig. 2 is a view taken on the line 2—2 of Fig. 1 with the photographic objectives disassembled therefrom, and Fig. 3 is a perspective view of one of the operating parts of our invention.

A preferred embodiment of our invention, shown generally at 10 in Fig. 1, comprises a support 11 having an enlarged circular plate-like portion 12 at its upper end. The lower part of support 11 carries a handle 13 by which the demonstrating device may be manually held, said handle having a mounting hole or receptacle 14 therein whereby the device 10 may be mounted on a tripod. A circular objective-carrying plate or turret 15 is rotatably mounted on the portion 12 by a pivot stud 16 which extends through a fitted hole 17 in the plate and is threaded at 18 into the support at the center of its circular portion 12. Smooth annular companion bearing surfaces 19 and 20 are formed, respectively, on the adjacent sides of the plate 15 and portion 12 and act as guide means so that the optical parts which are carried thereby are correctly aligned and registered with each other in all operative positions. The bearing surface 19 on plate 15 is resiliently held against the bearing surface 20 on portion 12 by a disk type spring 21 which is seated under pressure between a head 22 on the pivot stud 16 and the plate 15. Two different photographic objectives 23 and 24 are shown assembled into two threaded openings 25 in plate 15. Several of such openings may be provided in the plate 15 to hold other objectives of different kinds. Since the annular bearing surfaces 19 and 20 are closely fitted together, the circular portion 12 of support 11 provides a closed chamber which serves to protect the rear lens surfaces of the objectives 23 and 24 from accumulating dust and foreign matter. Closure caps (not shown) are available to cover the unused openings in plate 15 to further protect the objectives from dust and foreign matter. A spring-pressed detent ball 26 seated in a blind hole 27 in support 11 is provided so as to successively engage each of a series of spaced recesses, formed on the inner peripheral surface of plate 15, as shown at 28. Each recess is angularly located with reference to the other recesses so as to correctly align the objective which is in use with the sighting axis of the instrument.

All of the objectives which are attached to the plate 15 for demonstration are parfocalized so that the image formed by any one of them may be clearly focused upon a single stationary screen. The proper longitudinal positioning of each objective is mechanically accomplished by providing raised seating shoulders 29 and 30 located at different longitudinal distances from the surface 19 of the plate 15 corresponding to the individual differences in registration distances of the objectives used.

The upper part of portion 12 has an integral tubular member having a longitudinal opening 31 in which body tube 32 is mounted and held therein by means of a set screw 33. Within the tube 32 is secured a cell 34 in which is fixed a translucent screen 35 formed from suitable material such as glass. The turret side of screen 35 has a ground surface 36 so that each of the objectives 23, 24 etc., may be focused selectively so as to form on the screen a visible image of an object. On the ground surface 36 are formed by any preferred manner such as etching or engraving a plurality of frame marks 37 and 38 having sizes corresponding to the sizes of the frames of the films used with the respective objectives in plate 15.

For viewing the image formed by an objective on the surface 36, an optical system is provided comprising an eyepiece lens 39 which in this form of the invention is secured by a friction ring 40 within an eyepiece mounting sleeve 41. Sleeve 41 is slidably and rotatably fitted on the outer surface of body tube 32 and is connected thereto for longitudinal focusing movements by a pin 42 which is threaded at one end into sleeve 41 and engages at its other end within a spiral slot 43 formed in tube 32. Also comprised in said optical system is a stationary field lens 44 housed in a lens cell 45 which is anchored in the body tube 32 by a lock screw 46.

Between the screen 35 and eyepiece lens 39, an erector lens 47 is provided in the optical system to erect the image formed by the objectives 23 and 24. Lens 47 is mounted in a lens cell 48 which is retained in an inner bore 49 of a mounting sleeve 50 by a set screw 51.

For varying the magnification at which the screen image is viewed, the sleeve 50 is slidably fitted for longitudinal movement on the inner surface of the body tube 32. The erector lens 47 is moved between extreme front and rear operating positions by a stud 52 which is threadedly secured in the movable sleeve 50 so as to project outwardly through a longitudinal slot 53 in the body tube 32. Abutment surfaces at the ends of slot 53 limit the travel of the erector lens 47 between its extreme operating positions by contact of stud 52 with these surfaces. On the outer end of stud 52 is formed an enlarged head 54 and a suitable frictional spring detent 55, having a hole therein through which the stud extends, is seated under spring pressure beneath said head so as to bear forcibly against tube 32 to hold the erector lens 47 in a position which provides the desired magnification.

One of the conjugate focal planes of said optical system is substantially coincident with the surface 36 and the other conjugate focal plane is located substantially at the eyepoint of the instrument.

When comparing photographic objectives, for instance, by the use of the above-described demonstrating apparatus, the operator threads into the turret plate 15 the selected photographic objectives embodying focusing mounts and holds the apparatus in viewing position. The eyepiece 39 is rotated to bring the screen surface 36 into best focus. Then the instrument is directed towards a selected object and the operative objective is focused so as to produce an image of the object upon the screen surface 36. With the eyepiece lens 39 and objective now properly focused, the turret 15 is rotated to bring other selected objectives successively into viewing position and each objective is individually focused upon the screen as it is brought into operative position so as to agree with its conjugate object distance. The power of the eyepiece lens 39 is so chosen as to magnify the image to a comfortable viewing size but additional magnification for the smaller image sizes is obtained by moving the erector lens 47 farther away from the operator by means of the stud 52. Such an increase in magnification is very desirable when changing from 16 mm. camera objectives to objectives used with 8 mm. cameras, for instance, so that the apparent image size is agreeably large for all objectives. Although the demonstrating apparatus has been shown and described in connection with photographic objectives 23 and 24 which embody focusing mounts, it is to be understood that the apparatus may also be used for comparing the performance of objective lenses which are not in focusing mounts. The lens carrying turret plate may, instead of being rotatably mounted, be arranged for sliding movement across the opening 31.

It will be perceived from the foregoing description that there is here provided a demonstrating apparatus for quickly comparing under similar conditions the field of view, angular coverage, depth of field, and other characteristics which are associated with several photographic objectives having different optical properties, said apparatus having particular advantages in simplicity and ease of operation and being constructed to afford proper dust protection during operation. Although only a preferred form of this invention has been shown and described in detail, other forms are possible and changes and substitutions may be made in the form shown without departing from the spirit of the invention as defined in the claim herebelow appended.

We claim:

In a device for demonstrating photographic objectives, the combination of a support comprising a substantially flat plate having an opening therethrough, a handle depending from said support, a disk having a pivot stud therethrough for pivotally mounting said disk to said plate, smooth companion bearing surfaces formed on respectively adjacent peripheral areas of the disk and plate to permit relative movement therebetween, a plurality of raised shoulders on the outer face of said disk, each raised shoulder having a threaded aperture therethrough for receiving a photographic objective to be demonstrated, each aperture in said disk being adapted to be aligned with the opening in said plate to selectively bring objectives into operative position, the plate having a blind hole extending inwardly from said smooth bearing surface, a spring pressed ball seated in said blind hole and urged outwardly therefrom, the face of the disk having a series of peripherally spaced recesses whereby rotation of the disk will selectively engage the holes with the ball for holding a selected objective in alignment with the opening in the plate, a body tube mounted in said opening and projecting from said plate on the side opposite to said disk, a viewing screen fixed in said tube and having an image receiving surface within focusing range of the aligned objective, said surface having boundary markings thereon corresponding to the film sizes which are used with each of said objectives, a variable power viewing lens system mounted in said tube with its conjugate focal planes located substantially coincident with said image surfaces and with the eyepiece of the viewing system, and an erecting lens in said lens viewing system for erecting the image on the viewing screen whereby the image that is formed on said viewing screen by the selectively aligned objectives may be viewed through said system at different magnifications.

References Cited in the file of this patent

UNITED STATES PATENTS

| | | |
|---|---|---|
| 1,637,529 | Mitchell | Aug. 2, 1927 |
| 1,640,694 | Deming | Aug. 30, 1927 |
| 1,818,062 | Howell | Aug. 11, 1931 |
| 1,855,269 | Victor | Apr. 26, 1932 |
| 1,937,688 | Fear | Dec. 5, 1933 |
| 2,193,016 | Wood | Mar. 12, 1940 |
| 2,640,777 | Fachman | June 2, 1953 |